(12) United States Patent
Mattes et al.

(10) Patent No.: US 7,920,957 B2
(45) Date of Patent: Apr. 5, 2011

(54) METHOD AND CONTROL DEVICE FOR METERING FUEL TO COMBUSTION CHAMBERS OF AN INTERNAL COMBUSTION ENGINE

(75) Inventors: Patrick Mattes, Stuttgart (DE); Mark Damson, Stuttgart (DE); Matthias Schueler, Steinheim (DE); Christian Mader, Gerlingen (DE); Michael Kessler, Weissach (DE); Vincent Dautel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 11/922,833

(22) PCT Filed: Jun. 29, 2006

(86) PCT No.: PCT/EP2006/063704
§ 371 (c)(1),
(2), (4) Date: Feb. 5, 2009

(87) PCT Pub. No.: WO2007/006660
PCT Pub. Date: Jan. 18, 2007

(65) Prior Publication Data
US 2009/0211553 A1  Aug. 27, 2009

(30) Foreign Application Priority Data

Jul. 14, 2005  (DE) .......................... 10 2005 032 840
Apr. 26, 2006  (DE) .......................... 10 2006 019 317

(51) Int. Cl.
*F02B 3/12* (2006.01)

(52) U.S. Cl. ........................................ 701/104; 123/299
(58) Field of Classification Search .................. 123/299; 701/104
See application file for complete search history.

(56) References Cited

U.S. PATENT DOCUMENTS

| 5,402,760 | A  | * | 4/1995  | Takeuchi et al. ............... 123/300 |
| 6,196,184 | B1 |   | 3/2001  | Przymusinski et al. |
| 6,752,126 | B2 | * | 6/2004  | Pfaeffle et al. ................. 123/436 |
| 7,152,575 | B2 | * | 12/2006 | Fritsch et al. ................... 123/299 |
| 7,255,087 | B2 | * | 8/2007  | Kanne et al. .................... 123/299 |
| 7,497,199 | B2 | * | 3/2009  | Canale et al. .................... 123/299 |
| 2006/0259227 | A1 | * | 11/2006 | Fritsch et al. ................... 701/104 |

FOREIGN PATENT DOCUMENTS

| DE | 103 05 656 | 1/2004 |
| EP | 0 921 296 | 9/1999 |
| FR | 2 864 840 | 7/2005 |
| JP | 11-173200 | 6/1999 |
| JP | 2004-19637 | 1/2004 |

* cited by examiner

*Primary Examiner* — Erick Solis
(74) *Attorney, Agent, or Firm* — Kenyon & Kenyon LLP

(57) ABSTRACT

A method for metering fuel into a combustion chamber of an internal combustion engine is provided, in which a fuel quantity to be metered for a combustion is metered by a preinjection and at least one additional injection, and in which, in the operation of the internal combustion engine, quantity errors of the preinjection are ascertained from the signal of at least structure-borne noise sensor. The method is distinguished in that a correction value is formed as a function of the quantity error of the preinjection, and at least one of the additional injections is corrected using the correction value. A control device is also provided that controls the method.

11 Claims, 3 Drawing Sheets

METHOD AND CONTROL DEVICE FOR METERING FUEL TO COMBUSTION CHAMBERS OF AN INTERNAL COMBUSTION ENGINE

FIELD OF THE INVENTION

The present invention relates to a method for metering fuel into a combustion chamber of an internal combustion engine, in which a fuel quantity to be metered for a combustion is metered by a preinjection and at least one additional injection, and in which, in the operation of the internal combustion engine, quantity errors in the preinjection are ascertained from the signal of at least one sensor. The preinjection and the additional injections, especially the main injection, are also designated as being partial injections.

Furthermore, the present invention relates to a control device of an injection system of an internal combustion engine having at least one injector, which meters a fuel quantity for a combustion process by a preinjection and at least one additional injection into a combustion chamber of the internal combustion engine, the control device ascertaining fuel errors in the preinjection from the signal of at least one sensor, in the operation of the internal combustion engine.

BACKGROUND INFORMATION

Such a method and such a control device are each discussed in DE 103 05 656 A1. In this context, characteristic quantities are ascertained from the signal of the structure-borne noise sensor, the structure-borne noise signal first being filtered in at least two crankshaft angular ranges. A characteristic quantity may be ascertained, for each angular range, which characterizes the intensity of the sound emission in that angular range. The characteristic quantities ascertained characterize certain events and points in time in the work cycle of the internal combustion engine. In particular, in a preinjection, there exists a simple relationship between the intensity of the sound emission connected with it and the injected fuel quantity, so that the injected fuel quantity of a preinjection is able to be ascertained from the structure-borne noise signal according to the method broadly presented in DE 103 05 656 A1.

In a metering of fuel into the combustion chambers of an internal combustion engine taking place via injectors, the injectors are activated by injection pulse widths which open a flow cross section of the injectors for the duration of the injection pulse width.

Although the injection pulse width can be specified very accurately, the fuel quantity injected in each case in this context is a function of, among other things, the injection pressure and of properties of the injector itself, for instance, of a response delay at which the injector reacts to an injection pulse. These properties may be scattered from injector to injector, so that the fuel quantities respectively injected are also subject to undesired scatter. As a result, for example, the exhaust gas emissions of the internal combustion engine and/or the running properties of the internal combustion engine are influenced negatively. This applies particularly to the so-called main injection, because in it the greatest portion of the fuel quantity to be injected for a combustion process is metered. This brings about an interest in compensating for the scattering mentioned, which come up in deviations of an actually injected fuel quantity from a setpoint value for the fuel quantity to be injected. These deviations will also be designated below as quantity errors.

Therefore, there is a need for compensation or correction of the quantity errors in both the preinjections and the main injections. As was mentioned before, a comparatively simple relationship between the relatively small preinjection quantity and the structure-borne noise signal has turned out to exist, during testing. In other words: The relatively small preinjection quantities, and thus also their quantity errors, may be detected quite well from the structure-borne noise signal. However, it also turned out that this does not apply for the main injection quantities, which are greater in order of magnitude by a factor of 10 than the preinjection quantities. That is, the quantity errors of the main injection quantities cannot be detected directly with sufficient accuracy from the structure-borne noise signal. This applies analogously for all additional injections via which large fuel quantities are metered compared to the preinjection. The structure-borne noise signal is particularly suitable for this, but other output signals of other sensors, that indicate that a combustion has taken place, can also be used.

In light of this background, the exemplary embodiments and/or the exemplary methods of the present invention provides, for a method of the type mentioned at the outset, that a correction value is formed as a function of the quantity error of the preinjection, and at least one of the additional injections is corrected using the correction value. Correspondingly, for a control device of the type mentioned at the outset, it is provided that the control device forms a correction value as a function of the quantity error of the preinjection, and corrects at least one of the additional injections using the correction value.

SUMMARY OF THE INVENTION

This present invention is based on the recognition that there exists a correlation of the quantity errors in preinjections and the additional partial injections, such as the main injection. Using this correlation, the quantity error of the additional injections can be, so to speak, determined indirectly from the quantity errors of the preinjections which have been determined directly from the sensor signal.

Thus, the exemplary embodiments and/or the exemplary methods of the present invention makes possible an indirect determination of the quantity error of the additional partial injections from the quantity error determined for small injection quantities. Typical values of preinjection quantities are in a range between 0.6 and 2 $mm^3$ in an internal combustion engine taken as an example, whereas the additional injection quantities, especially the main injection quantity, are typically even able to assume values of 6 to 80 $mm^3$ in that example. This recognition is not obvious, and it is especially not so that the quantity error in preinjections and the main injection is equal, or that the quantity error is proportional to the injected fuel quantity, in a directly predictable manner. Rather, the correlation turns out to be individual for each individual injector. However, statistical relationships have shown up in this instance, which are utilized within the scope of the exemplary embodiments and/or the exemplary methods of the present invention. The exemplary embodiments and/or the exemplary methods of the present invention therefore also makes possible a correction of quantity errors in the case of the larger and additional injection quantities, without this requiring additional sensor systems, such as, for instance exhaust gas sensors having a resolution down to the individual cylinders, or cylinder pressure sensors for the individual cylinders.

In one particularly simple implementation it is provided that the correction for additional partial injections, such as the main injection, is taken over. In this context, the correction is only effective for small injection quantities. This can be implemented, for instance, in that the correction is effective only up to a threshold value of the injection quantity. Alternatively, it may be provided that for each injection quantity a given percentage value is stored, which gives the effectiveness of the correction. Thus, for small quantities, this value assumes the value 100%, and this decreases to 0% as one goes towards larger quantities. Thus, beginning at a certain value, the value 0% and the correction are ineffective. This implementation is based on the realization that, for small injection quantities, the correlation between the correction for the preinjection and the main injection is very high.

This procedure is particularly advantageous, since it is applicable to all injectors. No correlation values have to be determined for different injectors or injector types. No monitoring is necessary in production which checks whether the correlation has changed.

With a view to embodiments of the method, For each injection, a base value of a fuel quantity that is to be injected and a base value of a corresponding injection pulse width may be formed, that the function has a dependency of a product of the quantity error of the preinjection quantity and a factor, and at least one of the base values is linked with the correction value.

This embodiment makes use of the fact that a statistical observation has shown that the quantity errors of the preinjection quantity and the injection quantity of additional injections can be demonstrated, having a comparatively good approximation, by the factor mentioned that is to be ascertained by the statistical observation.

In the case of quantity errors of the preinjection quantity, which have already been recalculated by the control device into corresponding equivalents of the preinjection injection pulse width, it is economical, with a view to the calculating capacity of the control device, also to link a base value of a corresponding injection pulse width for the additional injection, especially for the main injection, to a correction value. However, the linking can also be undertaken, using an appropriately formed correction value, to a base value for the additional injection quantity, which proves the broad applicability of the present invention.

The linking may be additive, because this type of linking is particularly easy to carry out, and the correction value is then a direct measure for a quantity error of the additional injection, which can then also be compared, within the scope of additional functions, for instance, within the scope of diagnostic functions, directly to threshold values.

Moreover, the correction value may be additionally formed as a function of a pressure in a fuel pressure accumulator of the internal combustion engine.

This embodiment takes into consideration that a pressure dependency has shown up in a statistical evaluation of the correlation of quantity errors between preinjections and additional injections. This being so, taking into account the pressure dependency in the formation of the correction value improves the accuracy of the correction value for the quantity error of additional injections, ascertained indirectly from the structure-borne noise signal in preinjections.

The function may be a polynomial of the first degree having a slope that is a function of the factor and an additive offset that is a function of the pressure.

It has turned out that the form of the function as a polynomial of the first degree having the properties mentioned illustrates comparatively well the scattering that occurs, it being seen as a particular advantage that the influence of the pressure in the fuel pressure accumulator can be shown separately by an additive offset.

A further embodiment is distinguished by the function being a polynomial of higher than the first degree. It should be understood that, circumstances permitting, fluctuations can be illustrated more accurately using polynomials of a higher order, although it is true that the expenditure for establishing the polynomial coefficients and the expenditure for the calculations necessary for the corrections also rise.

The function may be defined by a correlation model, which assigns individually calculated quantity errors of the additional injection pulse widths to the quantity errors, ascertained in operation, in the preinjection pulse widths. It is particularly this correlation which permits an indirect determination of quantity errors of the additional injections from the quantity errors of the preinjection pulse widths, which are directly determined from the structure-borne noise signal.

The coefficients of the polynomial may be ascertained off-line, by statistical evaluation of correlations ascertained in a random sample of injectors of one type, between quantity errors in preinjection pulse widths and quantity errors in additional injection pulse widths. Thus, the term off-line means in this case an evaluation outside of a certain internal combustion engine, in which the injectors or injectors of the same type and/or model line and/or production lot are later used.

Because of this embodiment, the correlation of quantity errors in preinjections and additional injections does not have to take place individually for each manufactured injector, which makes mass production in large piece numbers simpler. The correction value may be additionally formed as a function of an operating period of injectors of the internal combustion engine.

This embodiment also makes possible the compensation for fuel quantity drift which occurs, for example, because of coking of the injector over its service life in the internal combustion engine. In this context, fuel quantity drift is understood to mean a change in the quantity error over the service life.

With regard to embodiments of the control device, the control device may perform at least one of the method embodiments mentioned above.

Further advantages will become apparent from the description and the attached figures.

It is understood that the aforementioned features and the features yet to be explained below may be used not only in the combination indicated in each instance, but also in other combinations or by themselves, without departing from the scope of the present invention.

Exemplary embodiments of the present invention are shown in the drawings and are explained in detail in the following description.

DETAILED DESCRIPTION

Figure 1:
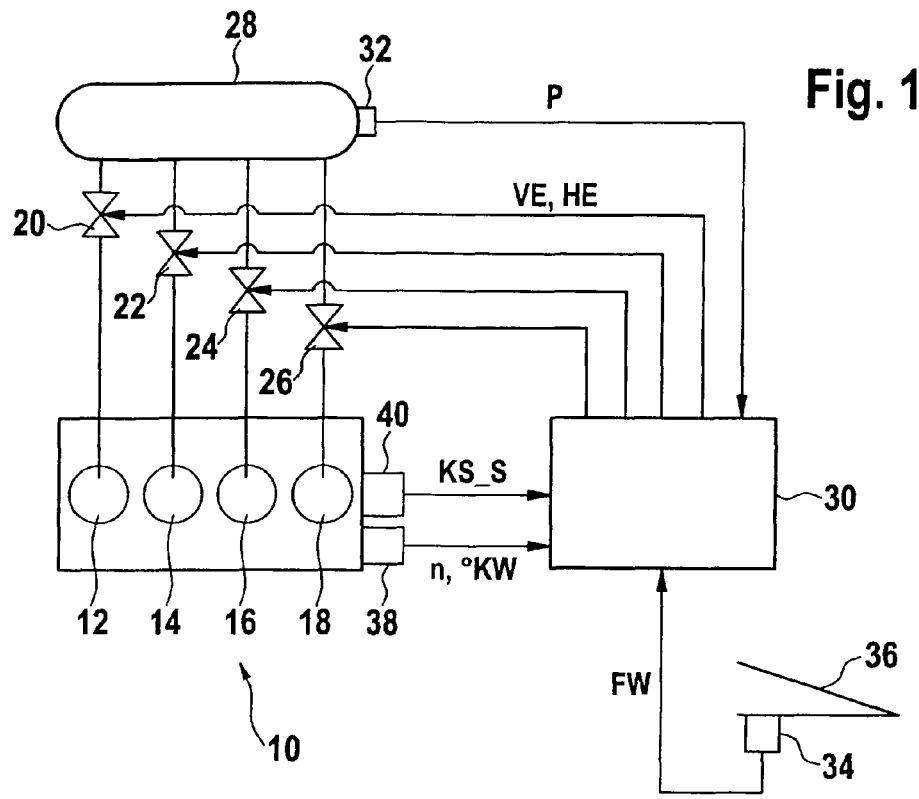
FIG. 1 shows the technical environment of the present invention.

FIG. 1 shows in detail an internal combustion engine 10 having combustion chambers 12, 14, 16, 18 into which fuel from a fuel pressure accumulator 28 is metered by injections, via assigned injectors 20, 22, 24, 26. To do this, the injection valves or injectors 20, 22, 24, 26 are activated while opening by a control device 30 having individual injector pulse widths. In this context, in each case for a combustion process in a combustion chamber 12, 14, 16, 18 a comparatively small fuel quantity is metered by a preinjection VE, while a comparatively large fuel quantity is metered later by a main injection HE. A fuel quantity metered at a certain injection pulse width via an injector 20, 22, 24, 26 is a function of the fuel pressure in fuel pressure accumulator 28. In order to take into consideration this influence, a pressure sensor 32 measures this fuel pressure p and passes a corresponding electrical signal to control device 30. The overall fuel quantity, which is to be metered in each case for one combustion process, is a essentially a function of a torque request which internal combustion engine 10 is supposed to satisfy. Such a torque request is recorded in the subject matter of FIG. 1 by a driver command transmitter 34, which may be connected, for instance, to an accelerator 36 of a motor vehicle, and which transmits an electrical signal corresponding to a driver's command FW to control device 30. For the calculation of injection quantities and especially for the control of the timing of individual injections, internal combustion engine 10 also has an angle sensor 38, which signals to control device 30 data about the rotary speed n of a crankshaft of internal combustion engine 10 and about an angular position °KW of the crankshaft. A structure-borne noise sensor 40 is mounted on internal combustion engine 10, and transmits to control device 30 a structure-borne noise KS_S, from which control device 30 in particular determines the fuel quantity metered in a preinjection VE, and determines the quantity error occurring in this context. The determination of the preinjection quantity takes place, for instance, according to the method from DE 103 05 656 A1. Alternatively, other methods, based on the signal of the structure-borne noise sensor or other methods based on other signals, for the determination of the quantity errors. In particular, all signals can be used for which a measurable effect occurs when there has been a preinjection and/or when there has not been a preinjection.

Figure 2:
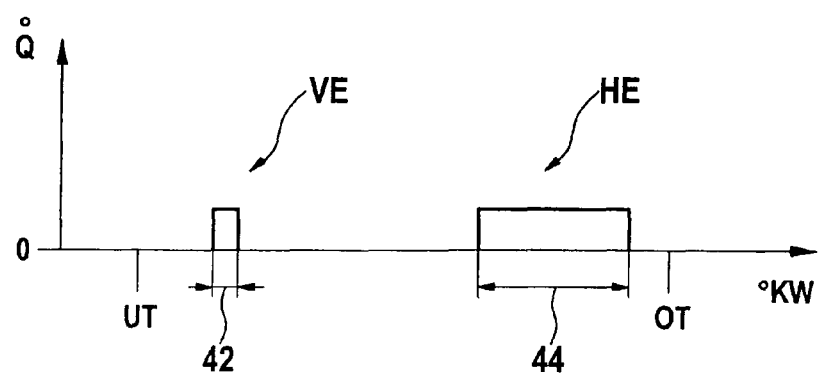
FIG. 2 shows qualitatively, a preinjection and a main injection in a compression stroke of an internal combustion engine.

FIG. 2 shows qualitative metering quantities and angular positions of a preinjection VE or a main injection HE in a compression stroke between a lower dead center UT and an upper dead center OT of a piston of internal combustion engine 10. Injection pulse widths 42 and 44 in time are assigned to the length of pulses VE, HE on the °KW axis, so that the respective injection quantities are yielded in each case as areas under the rectangular pulses designated by VE and HE, if Q corresponds to the volume flow through an injector 20, 22, 24, 26 in the open state.

Figure 3:
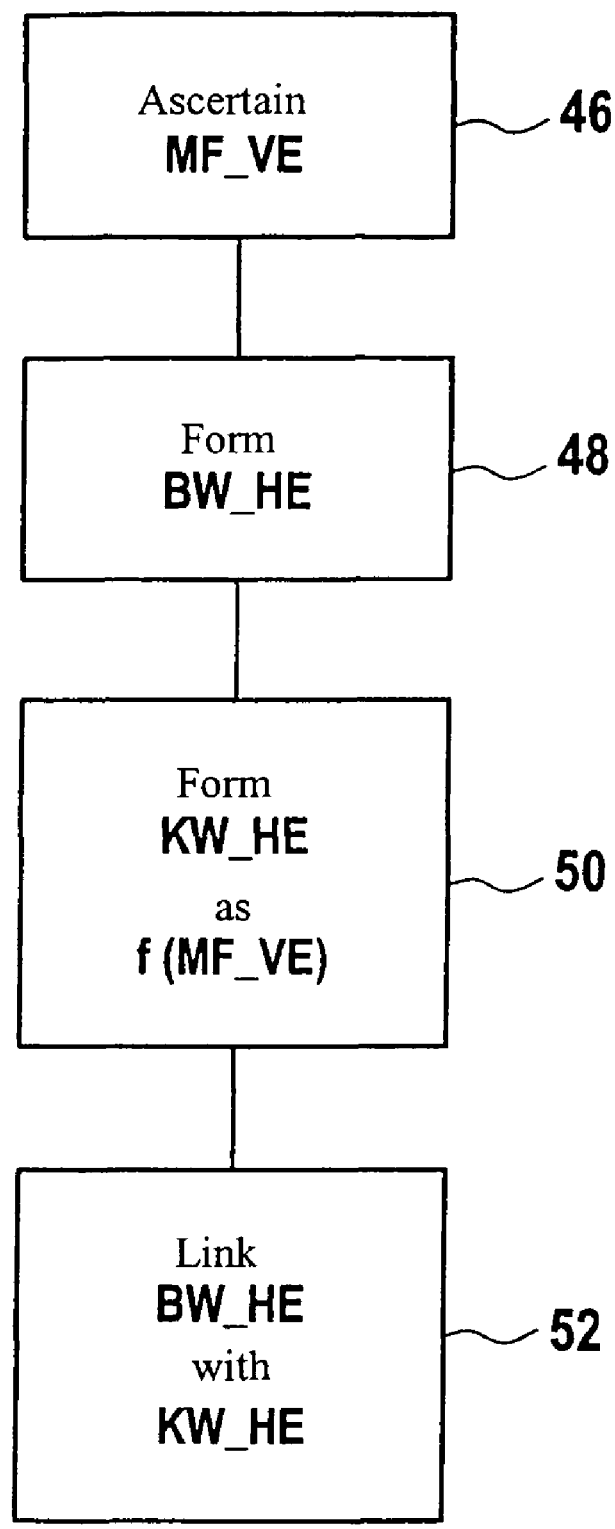
FIG. 3 shows a flow chart of an exemplary embodiment of a method according to the present invention.

FIG. 3 represents a flow chart as exemplary embodiment of a method according to the present invention, as is processed by control device 30 in the environment in FIG. 1. In this context, it should be understood that the flow chart in FIG. 3 only represents a section from a superordinated control program for controlling and/or regulating functions of internal combustion engine 10. In the superordinated engine control program, fuel quantities are continuously determined for preinjections VE, the assigned injection pulse widths 42 are calculated and injectors 20, 22, 24, 26 are activated using these injection pulse widths 42. From signal KS_S of structure-borne noise sensor 40, control device 30 ascertains, in step 46, a quantity error MF_VE of preinjections VE. In this context, the calculation of quantity error MF_VE can take place individually for each combustion chamber. In step 48, a base value BW_E is formed for main injection HE. In this context, the quantity BW_HE is to represent alternatively the assigned fuel quantity or the injection pulse width required for it. Base value BW_HE is determined, for instance, as a function of signal FW of driver's command transmitter 34, of a rotary speed signal n of angular sensor 38, and possibly of additional functions of the internal combustion engine, which are controlled by control device 30.

Examples of such functions are the regeneration of catalytic converters and/or particulate filters in the exhaust gas of internal combustion engine 10, in general, functions for increasing the exhaust gas temperature of internal combustion engine 10, or torque requests of other functions, for example, an air conditioning drive, a drive train control, etc. Step 48 is followed by a step 50, in which a correction value KW_HE for the main injection HE is formed as a function f of quantity error MF_VE of preinjection VE. After that, in step 52, there takes place a linking of base value BW_HE of main injection HE to assigned correction value KW_HE. From the result of step 52, injection pulse width 44 in FIG. 2 is formed.

Figure 4:
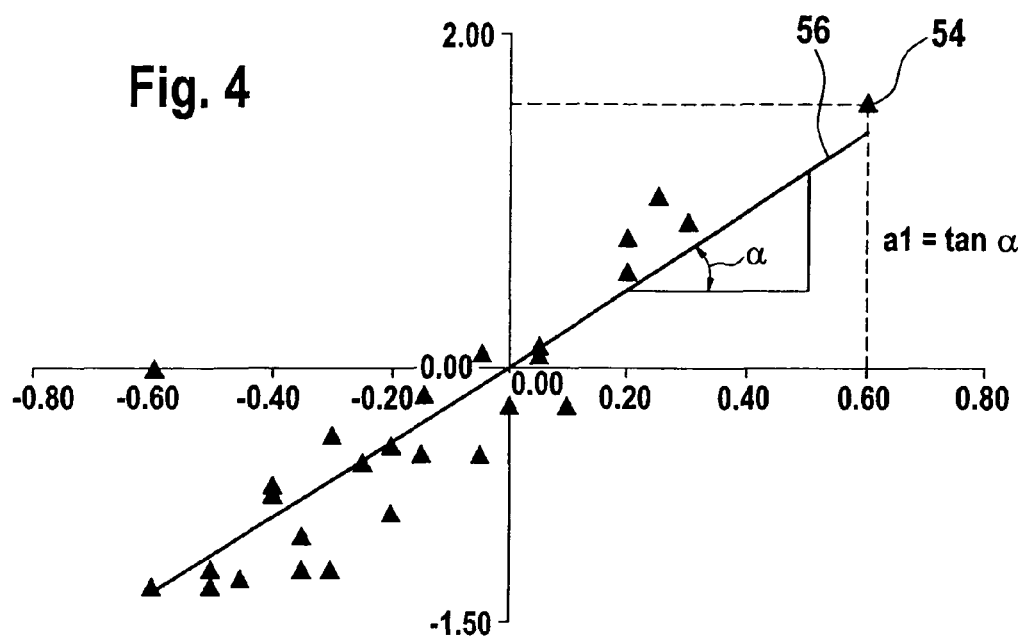
FIG. 4 shows a statistical distribution of quantity errors in additional injections in a plot of preinjections against quantity errors.

FIG. 4 shows a distribution of value pairs made up of quantity errors of main injections HE and quantity errors of preinjections VE in a plane stretching between axes for the quantity errors of preinjection VE and quantity errors of main injections HE. The quantity errors of preinjections are plotted, in this case, over the abscissa for preinjection quantities of 1 mm$^3$ of fuel, and the quantity errors of the main injections for injection quantities of 15 mm$^3$ of fuel are plotted along the coordinate for a random sample of 28 injectors of the same type. That is, in the case of value pair 54, there is a quantity error of 0.6 mm$^3$ at a preinjection quantity of 1 mm$^3$, or, in total, a preinjection quantity of 1.6 mm$^3$, whereas for the same injector, at a main injection quantity of 15 m$^3$, there comes about a quantity error of slightly more than 1.5 mm$^3$, that is, altogether a main injection quantity of somewhat greater than 16.5 mm$^3$. The equivalent applies for the remaining measuring points/value pairs shown in FIG. 4.

Distributions, such as the one shown in FIG. 4, are recorded off-line for an injector type, at regular time intervals during a test stand engine continuous operation. In this context, a distribution is recorded in each case for a certain common rail pressure (pressure in fuel pressure accumulator 28) or a certain interval of common rail values and a certain main injection quantity, or a certain interval of main injection quantities. For the implementation of an embodiment of the methods provided here, a best fit line 56 is drawn through the scatter diagram (distribution). Corresponding to this best fit line 56, this yields a quantity error MF_HE of a main injection HE as the sum of a product of a slope correlation coefficient a1 and quantity error MF_VE of a preinjection, and an additive offset a0, which specifies the intersection of best fit line 56 with the ordinate. In FIG. 4, a0 is approximately equal to 0. However, this is characteristic only for the pressure prevailing during the measurement in fuel pressure accumulator 28. At different values of this pressure, other values may be yielded for a0. It has turned out that changes in pressure P in fuel pressure accumulator 28 may reflect a change in additive offset a0, whereas changes in the fuel quantity in main injections HE reflect more strongly the response of slope correlation coefficient a1=tan α.

These correlation factors a1, a0 are calculated for measured combinations of fuel quantities of main injections HE and pressure P prevailing, in this context, in fuel pressure accumulator 28, and are stored in control device 30 of internal combustion engine 10 in two characteristics maps.

Figure 5:
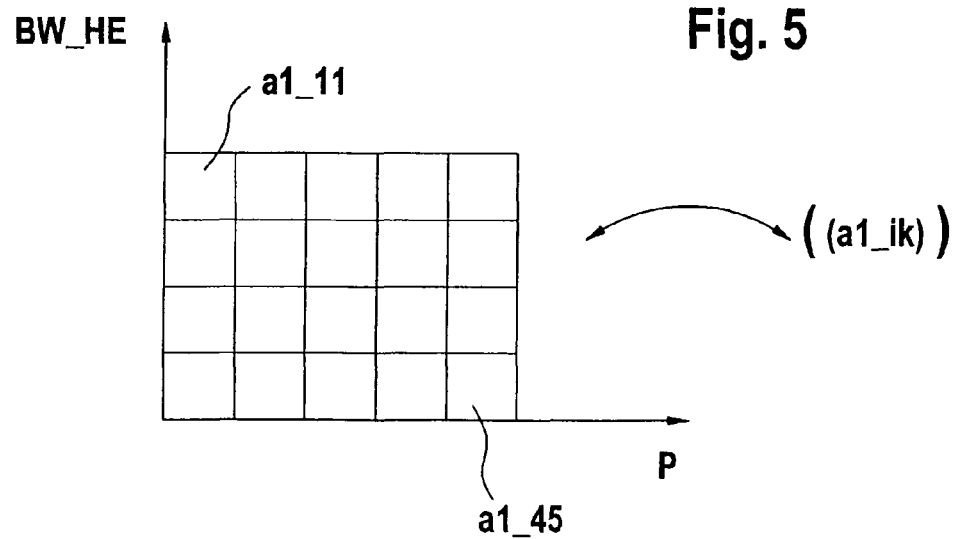
FIG. 5 shows a correction factor characteristics map set up by base values of main injections and by injection pressures.

Such a characteristics map is illustrated in FIG. 5 for slope correlation factor a1. In the operation of internal combustion engine 10, control device 30 forms base values BW_HE for main injections HE and measures the pressure in fuel pressure accumulator 28 with the aid of pressure sensor 32. With the quantities BW_HE and p thus formed and measured, characteristics map 58 shown in FIG. 5 is addressed, and a slope correlation factor a1 predetermined for this value pair of BW_HE and p is read out. Characteristics map 58 thus corresponds to a matrix $((a1\_ik))$, in which the individual matrix elements $a1\_ik$ represent the correlation factors, i is the number of rows, and thus, the fineness of subdivision of base values BW_HE for fuel quantities of main injections HE, and k is the number of columns which gives the fineness of the subdivision for fuel pressures p.

A corresponding characteristics map is yielded for the additive offset a0.

Thus, in the vehicle, the fuel quantity drift per injection, for small fuel quantities is typically measured in a VE range between a combustion limit all the way up to 4 mm$^3$. For the instantaneous engine operating point, factors a1 and a0 are interpolated from the characteristics maps mentioned. The fuel quantity drift for the instantaneous injection quantity is then calculated from the interpolated factors and the VE fuel quantity drift by the straight line equation given above. The correction of the fuel quantity drift is performed by intervention in the fuel metering of the additional injection (main injection and/or post-injection).

The calculation of the correlation can be made both via the injection quantity and via the duration of control of the injectors. Even the intervention in the fuel metering can be performed both as a quantity intervention and a duration of control intervention. In the calculation of the correlation via the duration of control, a simple functional structure comes about if the fuel quantity drift, at a small quantity, is already available as a control correction in control device 30. 0As was mentioned, instead of a straight line equation for reflecting the correlation, a different function can be used too, for instance, a polynomial of smaller or greater order. In addition, the correction of the fuel quantity drift can be adjusted to the operating time of the injectors. To do this, the correction value is multiplied by a factor that is a function of the operating time. This factor can be stored in control device 30 as, for instance, a characteristic line plotted against the internal combustion engine operating time.

A particularly simple and advantageous embodiment comes about if, as the function for reflecting the correlation, a characteristic line is provided which gives a quantity PW for the effectiveness of the correction of the preinjection on other injections, such as the main injection. A percentage value or a factor between zero and one is stored in the characteristic line for this purpose. Correction value KW_HE for the main injection is yielded starting from quantity error MF_VE for the preinjection, while using the following formula:

$$KW\_HE = MF\_VE * PW(BW\_HE),$$

the value PW being a quantity that indicates the effectiveness of the correlation, and, in this case, it assumes values between 0 and 1, as a function of the base value of the main injection. For small values of the fuel quantity to be injected, the quantity PW assumes the value 1, and for larger values for the fuel quantity to be injected, the quantity PW assumes the value 0. In the simplest case, the quantity PW decreases linearly from 1 to 0. Any dependencies whatsoever can be implemented, it being common to all of them that, for small fuel quantities, the quantity PW assumes a value near 1, and for large fuel quantities the value 0.

This means that a fixed correlation is assumed between the correction values for the preinjection and the additional partial injections, especially the main injection. The correction values for small quantities are taken over by the preinjection, in this context. For larger quantities, the correction values are partially taken over. In the case of large quantities, no correction is made.

The correction values are ascertained in operating states in which a preinjection takes place. These correction values are also used for the correction of the main injection. This correction of the main injection may take place in all operating states, and especially in operating states without preinjection.

This means that factor $a1\_ik$ assumes values between 0 and 1 that correspond to the quantity PW for the effectiveness of the correlation. In this context, factor $a1\_ik$ and quantity PW are stored in a characteristics map and/or a table, as functions of the injected fuel quantity of the partial injection to be corrected, in particular of the main injection.

What is claimed is:

1. A method for injecting fuel into a combustion chamber of an internal combustion engine, the method comprising:
    metering a target fuel quantity to be injected for a combustion by a preinjection and metering at least one additional partial injection;
    ascertaining, in operation of the internal combustion engine, a quantity error of the preinjection from a signal of at least one sensor, wherein the quantity error is the difference between the target fuel quantity and actual injected fuel quantity of the preinjection;
    forming a correction value as a function of the quantity error of the preinjection; and
    correcting the at least one additional partial injection using the correction value.

2. The method of claim 1, wherein for at least one partial injection, a base value of a fuel quantity that is to be injected or a base value of a corresponding injection pulse width is formed, and wherein the function depends on a product of the quantity error of the preinjection and a factor, and wherein the base value is linked to the correction value.

3. The method of claim 2, wherein the linking is additive.

4. The method of claim 2, wherein the correction value is additionally formed as a function of a pressure in a fuel pressure accumulator of the internal combustion engine.

5. The method of claim 4, wherein the function is a polynomial of a first degree having a slope that is a function of the factor and an additive offset that is a function of the pressure.

6. The method of claim 4, wherein the function is a polynomial of an order that is higher than the first degree.

7. The method of claim 5, wherein the function is specified by a correlation model which assigns individually calculated quantity errors of the additional injection pulse widths to the quantity errors of the preinjections that are ascertained in operation.

8. The method of claim 7, wherein the coefficients of the polynomial are ascertained off-line by statistical evaluation of correlations ascertained in a random sample of injectors of one type, between quantity errors in preinjection pulse widths and quantity errors in additional injection pulse widths.

9. The method of claim 1, wherein the correction value is additionally formed as a function of an operating period of injectors of the internal combustion engine.

10. The method of claim 1, wherein a structure-borne noise sensor is used as the sensor.

11. A control device of an injection system of an internal combustion engine having at least one injector, comprising:
  a metering arrangement configured to meter a target fuel quantity to be injected for combustion by a preinjection and meter at least one additional partial injection;
  an ascertaining arrangement configured to ascertain, in operation of the internal combustion engine, a quantity error of the preinjection from a signal of at least one sensor, wherein the quantity error is the difference between the target fuel quantity and actual injected fuel quantity of the preinjection; and
  a correction arrangement configured to form a correction value as a function of the quantity error of the preinjection, and to correct the at least one additional partial injection using the correction value.

* * * * *